United States Patent

Sutherland

[15] 3,659,354
[45] May 2, 1972

[54] BRAILLE DISPLAY DEVICE
[72] Inventor: Norman B. Sutherland, Bedford, Mass.
[73] Assignee: The Mitre Corporation, Bedford, Mass.
[22] Filed: Oct. 21, 1970
[21] Appl. No.: 82,564

[52] U.S. Cl. .................................... 35/35 A, 40/28 C, 40/37
[51] Int. Cl. ......................................................... G09b 21/00
[58] Field of Search .................... 40/28 C, 37; 35/35 A, 38, 1

[56] References Cited

UNITED STATES PATENTS

| | | | |
|---|---|---|---|
| 3,594,787 | 7/1971 | Ickes | 35/35 A |
| 3,391,480 | 7/1968 | O'Keefe | 40/37 X |
| 3,487,568 | 1/1970 | Woolfolk | 40/28 C |

FOREIGN PATENTS OR APPLICATIONS

| | | | |
|---|---|---|---|
| 1,018,369 | 10/1952 | France | 35/35 A |

Primary Examiner—Robert W. Michell
Assistant Examiner—Richard Carter
Attorney—Kenway, Jenney & Hildreth

[57] ABSTRACT

In the Braille display system disclosed herein a plurality of identical cells are arranged in a row and each cell is adapted to display a single Braille character. Each cell employs a plurality of pins which can be selectively raised to projecting positions by pneumatic signals which are common to all of the cells in a given row. Further, each cell includes an electrically actuable interposer member which can be selectively operated to either lock the pins in that cell in their existing positions or to free them and thereby enable them to respond to the common pneumatic signals.

11 Claims, 3 Drawing Figures

PATENTED MAY 2 1972 3,659,354

INVENTOR
NORMAN B. SUTHERLAND
BY
Kenway, Jenney & Hildreth
ATTORNEYS

BRAILLE DISPLAY DEVICE

BACKGROUND OF THE INVENTION

This invention relates to a Braille display system and more particularly to such a device which permits each of a plurality of character display cells to be independently set to a respective Braille pattern.

While Braille printing permits a blind person to read using his sense of touch, books printed in Braille code represent a very inefficient form of information storage. The paper which must be used in order to retain the embossed Braille pattern must necessarily be relatively heavy and the Braille pattern itself is necessarily relatively large in order to permit it to be read manually. Similarly, printed Braille material has the disadvantage that it is static, that is, it permits communication only through the relatively slow process of Braille printing. Typically, before a given piece of information can be so printed, it must be transcribed or in some way adapted by a sighted person familiar with the Braille code.

Among the several objects of the present invention may be noted the provision of a Braille transducer or display system which permits information to be presented in Braille or similar touch readable code; the provision of such a transducer which permits information stored in compact form to be readily displayed in a Braille code; the provision of such a transducer which permits the displayed information to be readily changed; the provision of such a transducer which will respond to machine compatible or machine generated codes and signals, such as those generated by an electronic computer or calculator; the provision of such a transducer in which information displayed can be held or maintained without the continual application of corresponding signals; and provision of such a transducer which is highly reliable and which is relatively simple and inexpensive. Other objects and features will be in part apparent and in part pointed out hereinafter.

SUMMARY OF THE INVENTION

Briefly, the transducer according to this invention employs a body member carrying a plurality of pins, each of which is slidable between a first position and a second position in a respective bore in the body member. Each pin includes a portion which projects from the body, so as to be manually perceptible, when the pin is in its second position. A plurality of transverse fluid channels are provided through the body member, each channel communicating with a respective one of the bores. The pins in the bores are thus movable between their respective first and second positions, in response to changes in fluid pressure within the respective passages. Means are also provided for selectively retaining the pins in their existing first or second positions. Accordingly, the pins in a selected individual transducer can thus be positioned by a pattern of fluid pressure signals, applied through the transverse channels, to form a corresponding pattern of projecting pin portions. The pattern can then be maintained, by appropriately operating the retaining means, even though the fluid pressure signal pattern is changed.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
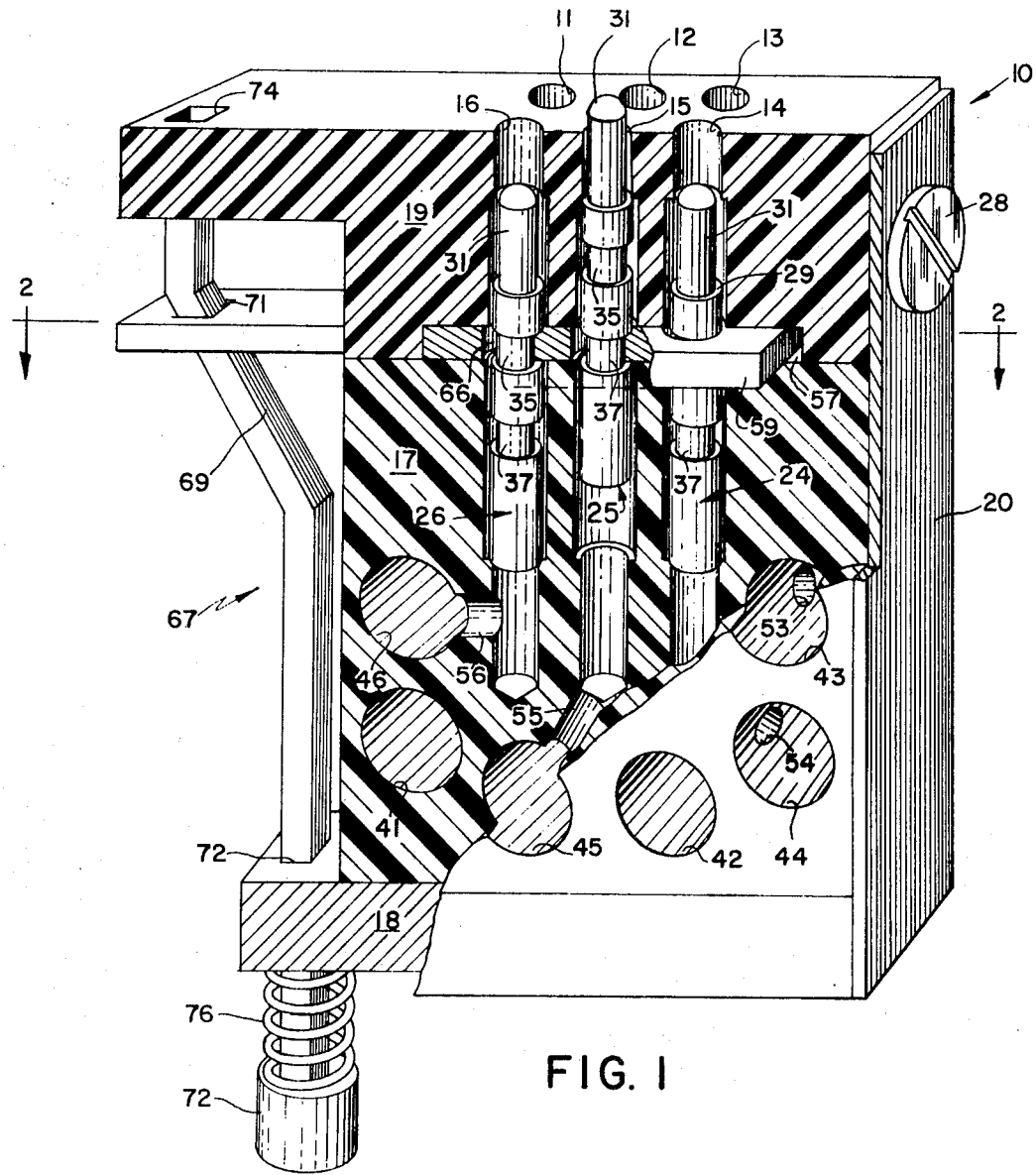
FIG. 1 is a plan view of a single transducer or display cell of the present invention.
Figure 2:
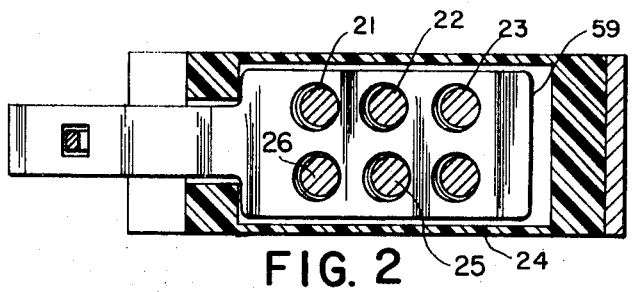
FIG. 2 is a sectional view taken substantially on the line 2—2 of FIG. 1.

Referring now to the drawings, the transducer illustrated in FIGS. 1 and 2 comprises a generally rectangular or block-like body member 10 having a plurality of parallel bores 11 – 16 opening through the upper face thereof. The bores 11 – 16 are arranged in a conventional two by three Braille pattern or matrix. To facilitate fabrication and assembly, body member 10 is constructed in three parts 17–19. A rigid plastic material may conveniently be used for the body parts. After machining, the central part 17 and the lower cap 18 are cemented together. The upper cap 19 is held in place by a back plate 20 which is cemented to the central part 17 and to which the upper cap is attached by means of a screw 28. The body member 10 is preferably relatively flat from side to side, as illustrated, so that a plurality of such elements can readily be combined side-by-side so as to form a row of Braille characters as described in greater detail hereinafter.

Each bore 11 – 16 holds a respective pin 21 – 26 which is slidable within the bore between a first or lower position and a second or raised position. As may be seen from FIG. 2, each pin is retained in its bore by a portion of the bore which is of reduced diameter and which is adapted to engage a shoulder 29 on the respective pin. Each pin includes a reduced diameter portion 31 which is adapted to extend through the reduced diameter portion of the bore when the pin is in its upper position and to project somewhat above the upper face of the body member 11. As will be apparent, these projecting portions 31 are adapted to form a manually perceivable Braille pattern when selected ones of the pins 21 – 26 are raised. Each pin 21 – 26 also has an upper peripheral groove 35 and a lower peripheral groove 37.

A plurality of pneumatic channels 41 – 46 extend through the body member 11 from side to side, that is, transversely to the bores 11 – 16. Each of the channels 41 – 46 communicates with a respective one of the bores 11 – 16 through a respective passage 51 – 56. While these passages are typically formed by drilling through from the outside of the central body part 17, the exterior openings are then plugged and are not indicated in the drawings. Assuming that its movement is not otherwise obstructed, each of the pins 21 – 26 is adapted to be raised to its second or upper position by the application of pneumatic pressure through the respective channel 41 – 46. Similarly, by the application of a vacuum through the respective channel, each pin can be caused to drop back to its first or bottom position. A spring or gravity return could also be used.

The body member 10 also includes a transverse slot 57 within which slides an interposer member 59. Interposer 59 includes a plurality of openings 61 – 66 in a pattern corresponding to that of the bores 11 – 16 and is slidable between a first or left-hand position in which the opening 61 – 66 are slightly misaligned with the bores 11 – 16 and a second or right-hand position in which the opening 61 – 66 are exactly aligned with the bores 11 – 16. When the interposer is in its right-hand position the pins 21 – 26 are freely movable between their upper and lower positions. On the other hand, when the interposer is in its left-hand position the portions thereof surrounding the opening 61 – 66 are adapted to engage or interfit with one or the other of the peripheral grooves 35 – 37 in each pin 21 – 26. Thus, when the interposer is in its left-hand position the pins are effectively held or maintained in their existing positions and vertical movement between these positions is blocked.

An actuating rod 67 is provided for moving the interposer 59 between its first and second position. Rod 67 is vertically slidable in slots 72 and 74 in the lower and upper body parts, 18 and 19 respectively. The rod 67 also includes an angled or inclined portion 69 which runs in a slot 71 in the interposer member 59 and acts as a cam for sliding the interposer from right to left as illustrated. Preferably the rod 67 is biased to its lower position by a spring as indicated at 76, the interposer being thereby normally returned to its left-hand or pin blocking position when the rod is released. The lower end of the rod 67 terminates in a button 72.

Figure 3:
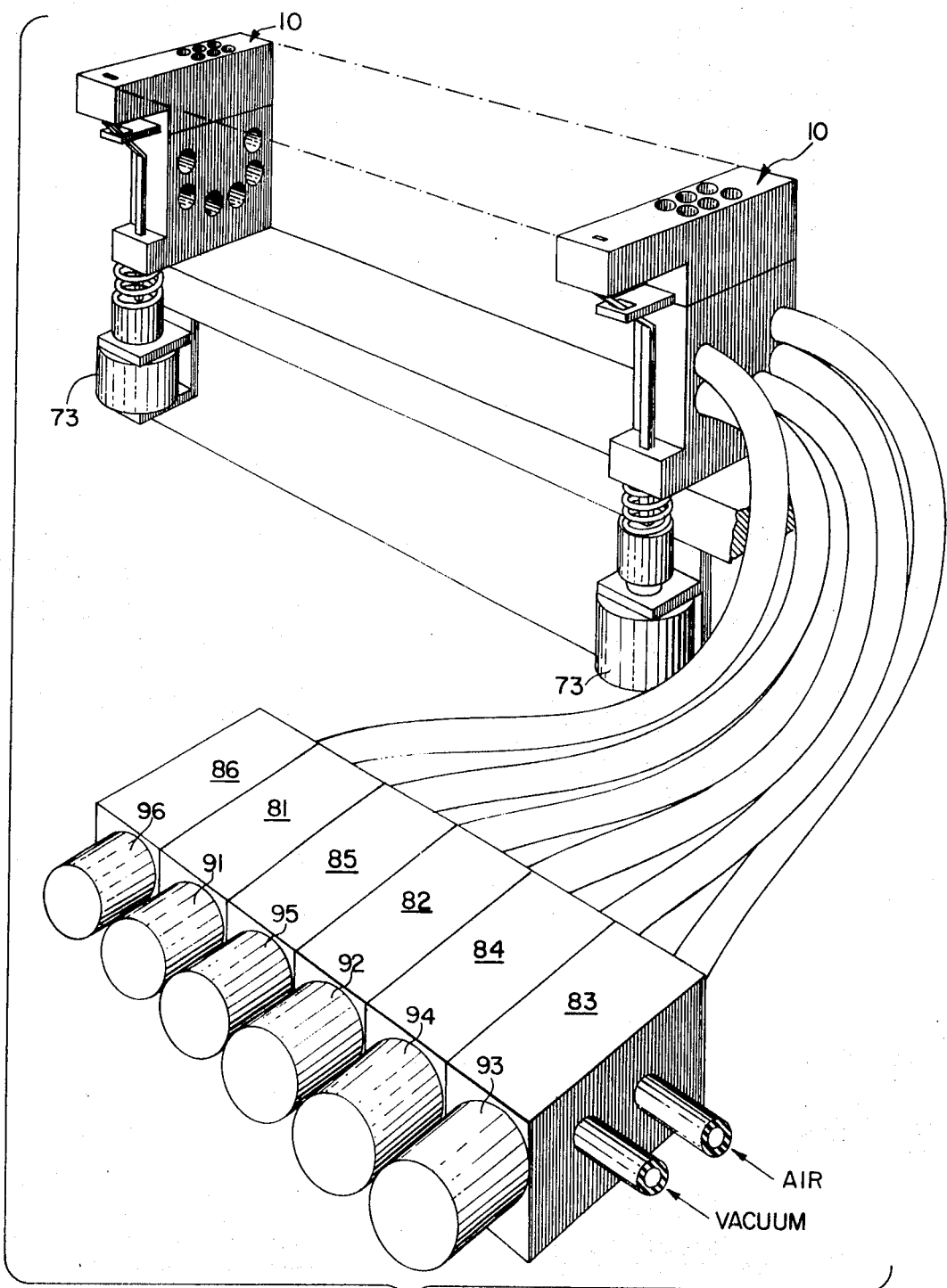
FIG. 3 is a somewhat diagrammatic perspective view showing a plurality of transducers of the type illustrated in FIG. 1, together with control apparatus cooperating therewith.

In operation, a plurality of individual cells or transducers are arranged side-by-side, as illustrated in FIG. 3, so that the air channels 41 – 46 of the various cells are in alignment and form common channels or passages linking all of the cells in a row, the various body members being clamped by suitable means, not shown. A respective push-type solenoid 73 is provided for selectively operating each of the cam rods 67, the rod being raised to release the respective set of pins 21 – 26 when the solenoid is energized. Air under pressure or a vacuum is then selectively applied to each of the common channels 41 – 46 through a respective two-way valve 81 – 86, the valves being electrically operated by respective solenoids 91 – 96. As is apparent, each Braille character which is to be displayed is produced by providing a corresponding pattern of pneumatic signals. Thus, to generate a particular Braille character, the solenoid valves are operated to apply air under pressure in a corresponding pattern through the common channels 41 – 46. Simultaneously, the cell or transducer which is to display that particular Braille character is enabled by energizing the respective solenoid 73. Thus, only the projecting pin pattern of the enabled cell is changed by the application of any given pneumatic signal pattern. Stated in other terms, the six pneumatic signals which represent any given character are applied in parallel but the patterns which represent successive Braille characters in the same line are provided serially.

As is understood, the generation of electrical signals in such mixtures of serial and parallel format is entirely compatible with so-called machine language, that is, the form of information employed by digital computers and calculators. As is also understood, the Braille code itself is a form of binary information or data and such information is compatible with the types of codes and information handling formats used by digital computers and calculators. Such data in binary form is readily adapted for efficient communication and storage, e.g., on magnetic tape. It can thus be seen that a display system according to the present invention is readily adaptable to facilitating the transfer of the information between a blind person and a computer or other digital information handling system. Accordingly, this system can permit a blind person to function usefully as computer programmer or operator without aid from sighted persons. Similarly, a display system employing transducers according to the present invention can facilitate the use of devices such as an electronic calculator or the reading of digital measuring devices such as voltmeter, thermometers or the like. In similar manner, a display system employing these transducers or cells can be used to display, to a blind person, information which has been recorded and stored in binary form. In other words, a book can be stored in Braille code on magnetic tape and then played back through a tape unit incorporating a display device according to the present invention. In this way, only one or a few lines of text need to be displayed in manually readable form at any one time. Thus, a relatively large amount of information, in a form useful by a blind person, can be stored in a relatively compact physical package.

In addition to providing a temporary display suitable for immediate reading by a blind person, the transducer of the present invention permits the recording, in a Braille format, of machine produced or otherwise only temporarily available information. As will be understood by those skilled in the Braille printing art, a suitable paper may be embossed by being pressed into contact with the projecting portion of pins 21 – 26 with a suitable compliant member such as a rubber-faced roller etc.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. A Braille display device comprising:
   a body member having a plurality of substantially parallel bores opening through one face thereof in a predetermined pattern, a plurality of channels in said body, each channel being connected with a respective one of said bores;
   a respective pin slidable in each bore between a first position and a second position, each pin having a portion adapted to project beyond said one face when the pin is in its second position, the pin in each bore being selectively movable between its first and second positions in response to changes in fluid pressure in the respective channel;
   an interposer member movable between a first position in which it blocks movement of said pins in said bores in either direction and a second position in which it permits such movement, whereby said pins can be moved by fluid pressure signals in said channels to provide a preselected pattern of projecting portions when said interposer member is in its second position and can then be retained in that pattern by moving said interposer member to its first position.

2. A Braille display device comprising:
   a body member having a plurality of substantially parallel bores opening through one face thereof in a predetermined pattern, a plurality of substantially parallel channels extending through said body transversely to said bores, each channel being connected with a respective one of said bores;
   a respective pin slidable in each bore between a first position and a second position, each pin having a portion adapted to project beyond said one face when the pin is in its second position, the pin in each bore being selectively movable between its first and second positions in response to changes in fluid pressure in the respective channel;
   an interposer member movable transversely to said bores between a first position in which it blocks movement of said pins in said bores in either direction and a second position in which it permits such movement; and
   means for selectively moving said interposer member between the respective first and second positions, whereby said pins can be moved by fluid pressure signals in said channels to provide a preselected pattern of projecting portions when said interposer member is in its second position and can then be retained in that pattern by operating said moving means to move said interposer member to its first position.

3. A display device as set forth in claim 2 wherein said interposer member comprises a slide having a plurality of apertures corresponding to said bores.

4. A display device as set forth in claim 3 wherein each of said pins has first and second circumferential grooves which are adapted to be selectively engaged by said slide.

5. A display device as set forth in claim 4 including electric motor means for selectively moving said slide into and out of engagement with said pins.

6. A display device as set forth in claim 2 including a respective means for selectively applying fluid under pressure to each of said channels.

7. A display device as set forth in claim 2 including a respective means for selectively applying to each of said channels either air under pressure or a vacuum.

8. A display device as set forth in claim 3 wherein said air pressure applying means comprises an electrically operated valve.

9. A Braille display device comprising:
   a generally flat body member having a pair of substantially flat parallel sides and a face extending transversely between said sides, said body member having also a plurality of substantially parallel bores opening through said face thereof in a predetermined rectilinear pattern, a plurality of substantially parallel channels extending through said body transversely to said bores and a respective passage connecting each of said channels with a respective one of said bores;

a respective pin slidable in each bore between a first position and a second position, each pin having a portion adapted to project beyond said one face when the pin is in its second position, said bores being adapted to retain said pins, the pin in each bore being selectively movable between its first and second positions in response to changes in fluid pressure in the respective channel;

an interposer member having a plurality of openings therein corresponding to said bores and being movable transversely to said bores between a first position in which it prevents movement of said pins in said bores in either direction and a second position in which it permits such movement; and electrically operable motor means for selectively moving said interposer member between the respective first and second positions, whereby said pins can be moved by fluid pressure signals in said channels to provide a preselected pattern of projecting portions when said interposer member is in its second position and can then be retained in that pattern by operating said motor means to move said interposer member to its first position.

10. A Braille display system comprising:

a plurality of devices in accordance with claim 9 held in side by side alignment with corresponding channels in adjacent devices being in registration; and means for selectively applying fluid under pressure to each set of aligned channels.

11. A display system as set forth in claim 10 wherein the respective means for applying fluid under pressure comprise solenoid operated valves.

* * * * *